United States Patent
Dade et al.

(10) Patent No.: US 12,052,150 B2
(45) Date of Patent: Jul. 30, 2024

(54) MONITORING WIRELESS ACCESS POINT EVENTS

(71) Applicant: Juniper Networks, Inc., Sunnyvale, CA (US)

(72) Inventors: Nicolas S. Dade, Santa Cruz, CA (US); Oscar Ernohazy, Saratoga, CA (US); Randall Wayne Frei, Los Altos, CA (US); Robert J. Friday, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 493 days.

(21) Appl. No.: 17/182,618

(22) Filed: Feb. 23, 2021

(65) Prior Publication Data

US 2021/0176143 A1    Jun. 10, 2021

Related U.S. Application Data

(63) Continuation of application No. 15/799,824, filed on Oct. 31, 2017, now Pat. No. 10,958,543, which is a
(Continued)

(51) Int. Cl.
*H04W 56/00* (2009.01)
*H04L 41/0604* (2022.01)
(Continued)

(52) U.S. Cl.
CPC ........ *H04L 43/028* (2013.01); *H04L 41/0604* (2013.01); *H04L 43/04* (2013.01);
(Continued)

(58) Field of Classification Search
CPC . H04L 43/028; H04L 41/0604; H04L 43/065; H04L 43/12; H04W 16/18; H04W 24/02; H04W 64/003; H04W 88/08
(Continued)

(56) References Cited

U.S. PATENT DOCUMENTS 6,745,011 B1    6/2004   Hendrickson et al.
9,137,723 B2    9/2015   Maguire et al.
(Continued)

FOREIGN PATENT DOCUMENTS

EP    3318045 A1    5/2018
EP    3318045 B1    2/2020
(Continued)

OTHER PUBLICATIONS

Examination Report from counterpart European Application No. 20156723.7 dated Oct. 22, 2021, 4 pp.
(Continued)

*Primary Examiner* — Sai Ming Chan
(74) *Attorney, Agent, or Firm* — Shumaker & Sieffert, P.A.

(57) ABSTRACT

A wireless access point system includes a processor configured to tap event data and process the event data using a plurality of event filters. Each event filter of the plurality of event filters applies event criteria to detect one or more types of events. The wireless access point system includes a memory configured to store the tapped event data. The wireless access point system includes a communication interface configured to report a report of a detected event type. At least a portion of the report is correlated to analyze a performance of a wireless network.

20 Claims, 7 Drawing Sheets

Related U.S. Application Data continuation of application No. 14/788,489, filed on Jun. 30, 2015, now Pat. No. 9,832,082.

(51) Int. Cl.

| | | |
|---|---|---|
| *H04L 43/028* | (2022.01) | |
| *H04L 43/04* | (2022.01) | |
| *H04L 43/065* | (2022.01) | |
| *H04L 43/12* | (2022.01) | |
| *H04W 16/18* | (2009.01) | |
| *H04W 24/02* | (2009.01) | |
| *H04W 64/00* | (2009.01) | |
| *H04W 88/08* | (2009.01) | |

(52) U.S. Cl.
CPC ............ *H04L 43/065* (2013.01); *H04L 43/12* (2013.01); *H04W 16/18* (2013.01); *H04W 24/02* (2013.01); *H04W 64/003* (2013.01); *H04W 88/08* (2013.01)

(58) Field of Classification Search
USPC .......................................................... 370/241
See application file for complete search history.

(56) References Cited

U.S. PATENT DOCUMENTS

| | | | |
|---|---|---|---|
| 9,613,512 B2 | 4/2017 | Williams | |
| 9,832,082 B2 | 11/2017 | Dade et al. | |
| 2006/0088014 A1 | 4/2006 | Ganesh | |
| 2006/0089985 A1* | 4/2006 | Poletto | H04L 43/02 709/224 |
| 2006/0242295 A1 | 10/2006 | Husemann et al. | |
| 2007/0002761 A1* | 1/2007 | Diamant | H04L 61/00 370/252 |
| 2007/0243864 A1* | 10/2007 | Jaquet | H04W 24/08 455/423 |
| 2008/0201109 A1 | 8/2008 | Zill et al. | |
| 2009/0287433 A1* | 11/2009 | Houston | G01R 21/133 702/62 |
| 2010/0027421 A1* | 2/2010 | Goossens | H04L 43/12 370/235 |
| 2012/0079105 A1 | 3/2012 | Hoffman | |
| 2013/0053055 A1 | 2/2013 | Kumar | |
| 2013/0063288 A1 | 3/2013 | Bley | |
| 2013/0114408 A1 | 5/2013 | Sastry et al. | |
| 2013/0148641 A1 | 6/2013 | Sivaprakasam et al. | |
| 2014/0254435 A1 | 9/2014 | Menendez et al. | |
| 2017/0005886 A1 | 1/2017 | Dade et al. | |
| 2017/0346675 A1* | 11/2017 | Prokofiev | H04L 41/0816 |
| 2018/0069771 A1 | 3/2018 | Dade et al. | |
| 2020/0145375 A1* | 5/2020 | Rubenstein | H04L 69/18 |

FOREIGN PATENT DOCUMENTS

| | | |
|---|---|---|
| WO | WO-2015164679 A1 | 10/2015 |
| WO | WO-2017003780 A1 | 1/2017 |

OTHER PUBLICATIONS

Response to Examination Report dated Oct. 22, 2021, from counterpart European Application No. 20156723.7 filed Feb. 22, 2022, 3 pp.
"U.S. Appl. No. 14/788,489, Examiner Interview Summary mailed Mar. 31, 2017", 3 pgs.
"U.S. Appl. No. 14/788,489, Non Final Office Action mailed Dec. 16, 2016", 24 pgs.
"U.S. Appl. No. 14/788,489, Notice of Allowance mailed Aug. 3, 2017", 13 pgs.
"U.S. Appl. No. 14/788,489, Preliminary Amendment filed Jun. 17, 2016", 3 pgs.
"U.S. Appl. No. 14/788,489, Response filed Apr. 14, 2017 to Non Final Office Action mailed Dec. 16, 2016", 8 pgs.
"U.S. Appl. No. 15/799,824, 312 Amendment filed Feb. 11, 2021", 7 pgs.
"U.S. Appl. No. 15/799,824, Advisory Action mailed May 14, 2020", 4 pgs.
"U.S. Appl. No. 15/799,824, Appeal Brief filed Aug. 7, 2020", 22 pgs.
"U.S. Appl. No. 15/799,824, Examiner Interview Summary mailed Sep. 27, 2019", 3 pgs.
"U.S. Appl. No. 15/799,824, Final Office Action mailed Mar. 6, 2020", 24 pgs.
"U.S. Appl. No. 15/799,824, Final Office Action mailed May 31, 2019", 21 pgs.
"U.S. Appl. No. 15/799,824, Non Final Office Action mailed Aug. 23, 2019", 23 pgs.
"U.S. Appl. No. 15/799,824, Non Final Office Action mailed Oct. 1, 2018", 31 pgs.
"U.S. Appl. No. 15/799,824, Notice of Allowance mailed Nov. 12, 2020", 9 pgs.
"U.S. Appl. No. 15/799,824, Preliminary Amendment filed Nov. 28, 2017", 6 pgs.
"U.S. Appl. No. 15/799,824, Response filed Jan. 29, 2019 to Non Final Office Action mailed Oct. 1, 2018", 7 pgs.
"U.S. Appl. No. 15/799,824, Response filed May 1, 2020 to Final Office Action mailed Mar. 6, 2020", 16 pgs.
"U.S. Appl. No. 15/799,824, Response filed Jul. 29, 2019 to Final Office Action mailed May 31, 2019", 12 pgs.
"U.S. Appl. No. 15/799,824, Response filed Nov. 19, 2019 to Non Final Office Action mailed Aug. 23, 2019", 15 pgs.
"European Application Serial No. 16818483.6, Communication Pursuant to Article 94(3) EPC mailed Mar. 25, 2019", 4 pgs.
"European Application Serial No. 16818483.6, Extended European Search Report mailed Jul. 23, 2018", 7 pgs.
"European Application Serial No. 16818483.6, Response filed Feb. 4, 2019 to Extended European Search Report mailed Jul. 23, 2018", 12 pgs.
"European Application Serial No. 16818483.6, Response filed Jun. 22, 2018 to Communication Pursuant to Rules 161(1) and 162 EPC mailed Feb. 6, 2018", 8 pgs.
"European Application Serial No. 16818483.6, Response filed Jul. 2, 2019 to Communication Pursuant to Article 94(3) EPC mailed Mar. 25, 2019", 11 pgs.
"European Application Serial No. 20156723.7, Extended European Search Report mailed Jun. 19, 2020", 7 pgs.
"European Application Serial No. 20156723.7, Response filed Jan. 27, 2021 to Extended European Search Report mailed Jun. 19, 2020", 20 pgs.
"International Application Serial No. PCT/US2016/038674, International Preliminary Report on Patentability mailed Jan. 11, 2018", 8 pgs.
"International Application Serial No. PCT/US2016/038674, International Search Report mailed Sep. 7, 2016", 2 pgs.
"International Application Serial No. PCT/US2016/038674, Written Opinion mailed Sep. 7, 2016", 6 pgs.
Communication pursuant to Article 94(3) EPC from counterpart European Application No. 20156723.7 dated Jan. 3, 2024, 4 pp.
Response to Communication pursuant to Article 94(3) EPC dated Jan. 3, 2024, from counterpart European Application No. 20156723.7 filed Apr. 1, 2024, 13 pp.

\* cited by examiner

MONITORING WIRELESS ACCESS POINT EVENTS

CROSS REFERENCE TO OTHER APPLICATIONS

This application is a continuation of and claims priority to U.S. patent application Ser. No. 15/799,824, filed Oct. 31, 2017, which is a continuation application of U.S. patent application Ser. No. 14/788,489, now U.S. Pat. No. 9,832, 082, entitled MONITORING WIRELESS ACCESS POINT EVENTS and filed Jun. 30, 2015. The contents of these prior applications are considered part of this application, and are hereby incorporated by reference in their entirety.

BACKGROUND OF THE INVENTION

A wireless access point allows clients to wirelessly access a network. However, when a client encounters a network error or an issue while utilizing the wireless access point, often the error/issue must be diagnosed and fixed manually by a user or a network administrator. For example, in a commercial setting, a network administrator is tasked with manually diagnosing, reporting, and resolving, if possible, any problems with network connectivity, including the wireless access point. This can be often tedious, inefficient, and expensive to manually resolve using professional human resources. Additionally, it would be beneficial to prevent, handle, and resolve network issues as soon as possible to improve user experience. Therefore, there exists a need to more efficiently analyze the performance and issues of wireless clients connected to a wireless network.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Facilitating analysis of wireless network performance (e.g., wireless network performance of a mobile user) and mitigating the root cause is disclosed. In some embodiments, event and performance data is tapped at a wireless access point. For example, the network packets of the wireless access point are intercepted within the wireless access point for analysis to detect any event types of interest. The tapped event data is stored temporarily for potential future analysis. For example in one embodiment, the event data is stored in a ring buffer for analysis. In some embodiments, the event data is processed using a plurality of event filters, each of which applies event criteria to detect one or more types of events. For example, each filter has been configured to analyze the stored event data to identify an event type of interest, and when the event type of interest has been detected, additional processing may be performed (e.g., report the event type of interest, resolve errors associated with event type, etc.). The detected event types are reported. For example, a report on a detected event type is sent to a remote server via a network for further analysis. In some embodiments, detected event types are correlated across different wireless access points at a server so that performance of the wireless network can be analyzed, improved, and/or reported (e.g., report to network administrator).

Figure 1:
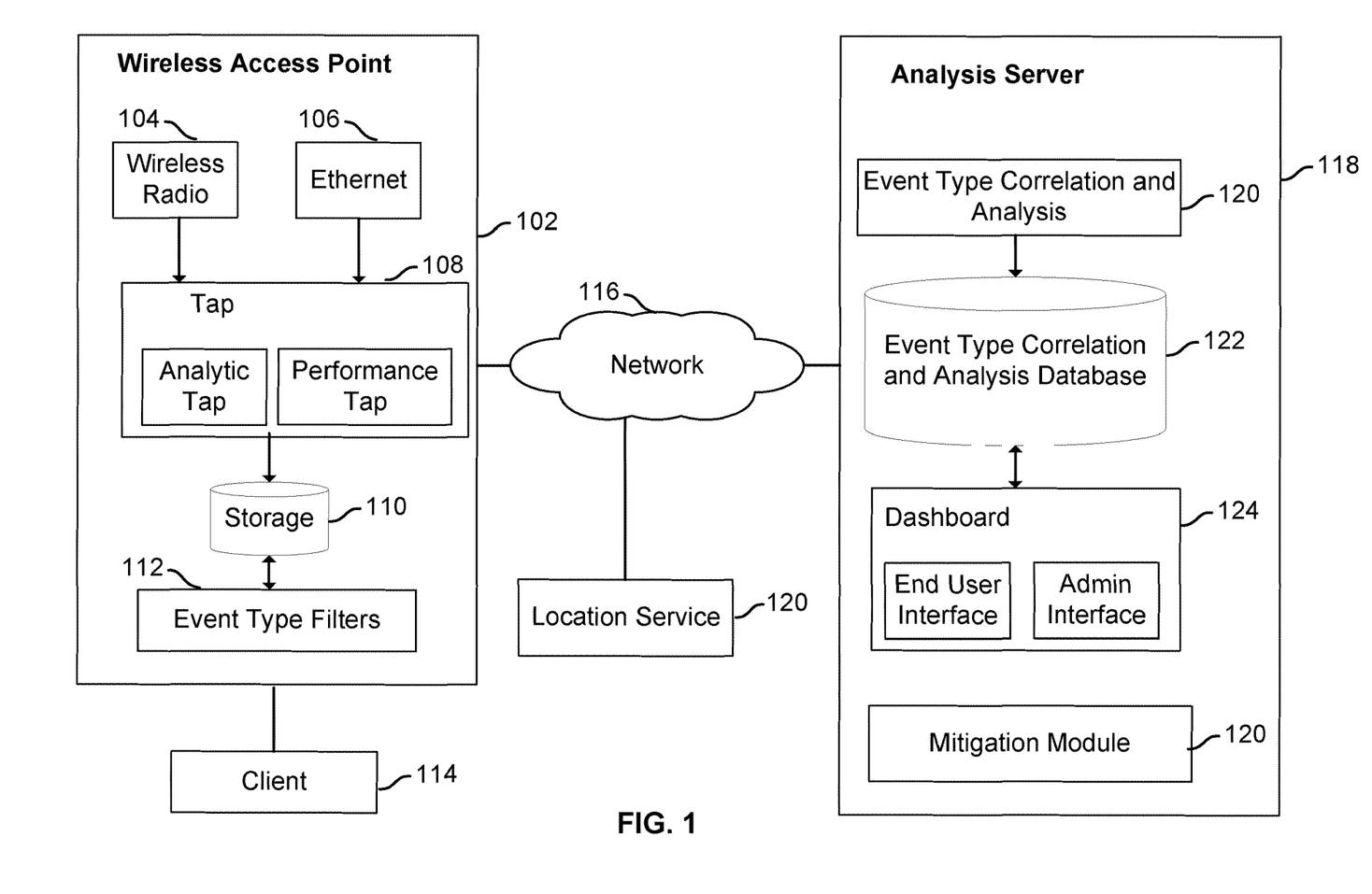
FIG. 1 is a block diagram illustrating an embodiment of a system for analyzing event data of a wireless access point.

FIG. 1 is a block diagram illustrating an embodiment of a system for analyzing event data of a wireless access point and/or wireless client. A wireless access point (i.e., AP) allows one or more client devices to wirelessly connect to a network. For example, client 114 connects to wireless access point 102 via a wireless connection and accesses the Internet via AP 102. Although only one client is shown as connected to AP 102 in the example of FIG. 1, a plurality of clients may be connected to AP 102 simultaneously and the clients may communicate with one another via AP 102. Examples of client 114 include a laptop computer, a desktop computer, a smartphone, a tablet computer, an Internet of Things device, a wearable computer, a wireless repeater, a wireless router, or any other wireless computer or device. In some embodiments, AP 102 includes and/or is included in a wired router. For example, AP 102 includes a wired Ethernet router. AP 102 includes components wireless radio 104, Ethernet 106, tap 108, storage 110, and event type filters 112. The components shown in FIG. 1 may be hardware and/or software components. For example, wireless radio component 104 may include a wireless radio driver, integrated circuit chip, and/or firmware. In another example, Ethernet component 106 includes an Ethernet controller, driver, chip, and/or firmware. In some embodiments, wireless radio 104 receives communication to/from client 114 wirelessly and the communication is routed from/to Ethernet 106 for communication via a wired connection to network 116. Examples of wireless communication between wireless radio 104 and client 114 include Wi-Fi, IEEE 802.11x, Bluetooth, and/or other wireless standards and protocols.

Tap component 108 taps into wireless radio 104 and Ethernet 106 to obtain event data of interest. For example, packets such as control packets and data communication packets received or sent by wireless radio 104 and/or Ethernet 106 or communicated between wireless radio 104 and Ethernet 106 are obtained by tap 108. Tap component 108 may include any number of component taps. For example as shown in FIG. 1, tap 108 includes an analytic tap and a performance tap. For example, the performance tap examines the actual contents of network packets to observe headers and statistics on packet flow to identify data packets for storage in storage 110 and the analytic tap observes network statistics (e.g., client received signal strength indicator (RSSI), dropped packets, etc.) to identify analytic performance data for analysis and storage in storage 110. In some embodiments, the software and/or firmware drivers of wireless radio 104 and/or Ethernet 106 have been configured to allow tap 108 to receive (e.g., intercept) event data of interest. Tap 108 may be a software module of a software kernel of AP 102. In some embodiments, the event data obtained by tap 108 have been selectively obtained based on one or more preconfigured criteria. In some embodiments, the events/data obtained by tap 108 include every packet of wireless radio 104. In some embodiments, the types of data obtained by tap 108 include specific types of data specified by one or more event type filters of component 112. The event data obtained by tap 108 are stored in storage 110. Examples of storage include a memory, a hard drive, a flash drive, a buffer and any other type of storage. In some embodiments, event data entries stored by tap 108 in storage 110 are automatically deleted based on a policy. For example, an oldest entry is selectively deleted when storage 110 is full to create storage space for a new data entry. In another example, an entry is deleted after a predetermined amount of time has passed since a timestamp of the entry. In another example, all events/data associated with a particular client are deleted when the particular client is disconnected from AP 102. In some embodiments, event data obtained by tap 108 is stored in a ring buffer of storage 110. For example, the ring buffer is limited in total storage size and/or total number of entries and when the ring buffer is full, entries are deleted in a first-in-first-out order to create storage space for a new entry to be added.

Event type filters component 112 includes one or more preconfigured filters. For example, a user/administrator is able to add/remove/modify one or more desired filters to event type filters 112. Each filter may define one or more event criteria to classify event data to detect one of a plurality of types of events. For example, event data (e.g., network packets) stored in storage 110 is analyzed using a filter to determine whether a type of event to be detected using the filter has been detected. A filter may perform actions such as send/receive network data based on the detection of the type of event. For example, event type filters are utilized to detect potential and/or existing network problems and automatically mitigate and/or resolve the network problems. In some embodiments, an event type filter sends a report regarding one or more detected event types to analysis server 118 via network 116 for analysis. For example, detected types of events at various APs are correlated by analysis server 118. The report may include data packets, indication of type of event detected, a status of an AP, and/or any other information associated with the type of event. In some embodiments, the report is sent by the event type filter to another AP. For example, rather than correlating information across various APs at a remote analysis server, an AP receives one or more reports from other APs to correlate data and determine a correlation result. In some embodiments, the data associated with a detected event is stored in storage 110 by an event type filter. In some embodiments, storage 110 tracks a status and/or other information associated with each client connected to AP 102.

Analysis server 118 may include one or more devices. For example, analysis server 118 represents a cloud/cluster of servers and/or networked storage. Analysis server 118 includes event type correlation and analysis component 120. Component 120 receives data from event type filters of different APs and correlates the data to determine a result. In some embodiments, component 120 receives data from location service 120 for correlation and analysis with one or more event reports. In some embodiments, location service 120 tracks determined physical locations of one or more clients that are connected any of one or more APs, including AP 120. For example, based on signal strength, reported GPS data and/or other detected factors, current physical locations of clients connected to APs of a physical site are tracked by location service 120. In some embodiments, component 120 performs correlation for a single type of event and receives reports from the same event type filter of various different APs. There may exist a plurality of different event type correlation and analysis engines within server 118. For example, each different event type correlation and analysis engine of server 118 corresponds to a different type of event type filter (e.g., filter of 112). In some embodiments, event type correlation and analysis component 120 performs correlation and analysis for a plurality of different types of events. In some embodiments, component 120 performs correlation and analysis using external event types (e.g., external events/data gathered/received from sources external a network of clients and APs) in addition to internal event types detected by one or more APs. For example, a release of a new operating system is detected from an external source and correlated with event types reported by APs. In some embodiments, performing the correlation and analysis includes determining similarities and patterns of detected types of events. For example, a network error is detected by various event type filters of APs that are correlated to identify a common cause of the network error. In some embodiments, performing the correlation and analysis includes sending a command and/or instruction to one or more APs. For example, an instruction/command on how to resolve and/or mitigate a detected problem is sent to APs identified to be affected. In some embodiments, an event type filter sends a report to server 118 for analysis to offload processing in an effort to save the computing resources required of an AP.

Event type correlation and analysis database 122 stores correlation and analysis results of one or more event type correlation and analysis components (e.g., component 120). In some embodiments, database 122 stores data/reports received from one or more APs for analysis by one or more event type correlation and analysis components (e.g., component 120). In some embodiments, database 122 tracks the status of one or more APs and/or clients of one or more APs. For example, database 122 tracks each client that has been affected by a particular network error. Mitigation module 120 receives input from one or more event type correlation and analysis engines (e.g., engine 120) and/or database 122 to determine one or more instructions to be provided to a AP, a client, an end user and/or a network administrator to mitigate, resolve and/or prevent detected network issues (e.g., network error). In an alternative embodiment, mitigation module 120 is external to server 118. Dashboard 124 provides one or more interfaces to allow an end user of a client and/or administrator to view correlation/analysis results and/or a status/performance of one or more APs. For example, correlation/analysis results of an issue affecting clients of APs managed by a network administrator are able to be viewed by the network administrator via a webpage interface of dashboard 124 accessed via network 116. In some embodiments, an administrator and/or an end user is provided an identification of an issue (e.g., network error) affecting one or more APs and/or clients and is provided an interface/instructions to manage and/or mitigate/resolve the issue.

Examples of network 116 include one or more of the following: a direct or indirect physical communication connection, a mobile communication network, a wireless network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. The connections between the components shown in FIG. 1 may be a wired connection, a wireless connection, and/or software data communication paths. In some embodiments, client 114 connects to AP 102 to access the Internet of network 116. Although single instances of the components shown in FIG. 1 have been shown to simplify the diagram, additional instances of any of the components shown in FIG. 1 may exist. For example, any number of APs may exist and provide data/reports to server 118. Any number of analysis servers may be connected to network 116. Many clients may be connected to AP 102. Any number of event type filters and event type correlators may exist. Components not shown in FIG. 1 may also exist.

Figure 2:
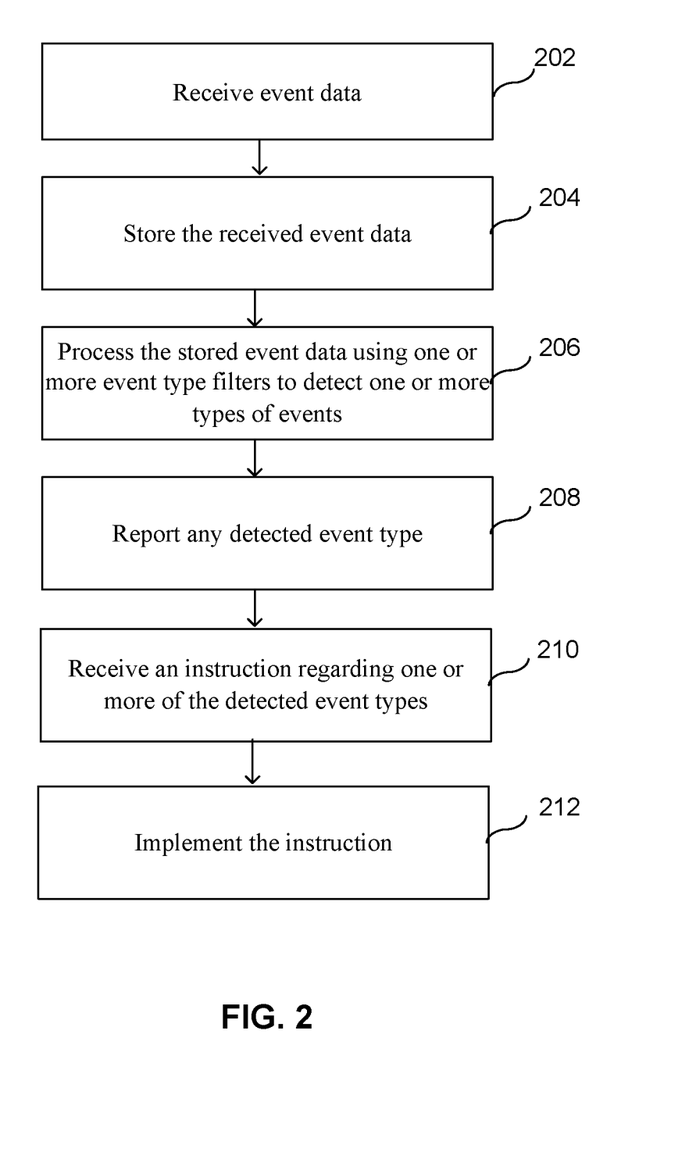
FIG. 2 is a flow chart illustrating an embodiment of a process for processing events to determine one or more types of events.

FIG. 2 is a flow chart illustrating an embodiment of a process for processing events to determine one or more types of events. The process of FIG. 2 may be implemented on wireless access point 102 of FIG. 1. In various embodiments, at least a portion of the process of FIG. 2 is repeated periodically and/or dynamically.

At 202, event data is received. In some embodiments, receiving the event data includes tapping into occurrences of events at an AP. In some embodiments, receiving the events includes intercepting event data at an AP. For example, the received event data is a copy of packets handled by the AP. The event data may include control packets, data packets, message packets, or any other forms of communication network packets. In some embodiments, one or more drivers and/or firmware of an AP provides access to the received event data. For example, a wireless radio driver and/or Ethernet driver has been configured to provide the received event data. In some embodiments, the event data includes one or more communications to and/or from a wireless radio component and/or an Ethernet component of an AP. In some embodiments, the event data is received at a software and/or hardware component of the AP configured to handle the received events.

In some embodiments, receiving the event data includes allowing network packets of interest to be processed and routed as normal by the AP while copying the network packets to storage 110 to be received at 202. In some embodiments, the received event data is received at tap 108 of FIG. 1. For example, tap 108 implemented in a kernel module of AP 102 monitors network packets and the status of AP 102 and obtains the information of interest. In some embodiments, only specific event data that fits a criteria is received. For example, packets are filtered using one or more specified filters to only receive packets of interest. The criteria may be specified by a user/administrator. In some embodiments, the criteria is associated with one or more event type filters (e.g., event type filters 112 of FIG. 1). For example, the criteria utilized to filter the received event data corresponds to event data to be analyzed by one or more event type filters to detect one or more types of events. In some embodiments, the received events are filtered after being received and specific event data that does fit a criteria is dropped.

At 204, the received event data is stored. For example, the packets and/or status/information of interest of an AP is stored in storage 110 of FIG. 1. In some embodiments, storing the event data includes filtering the received data to only store event data that meets the criteria. For example, the criteria utilized to filter the received events corresponds to event data to be analyzed by one or more event type filters to detect one or more types of events. In some embodiments, storing the event data includes deleting an event data entry from storage 110. For example, of the event data stored in a first-in-first-out data structure, the oldest entry in the data structure is removed if the data structure is full. In some embodiments, a stored event data entry expires after a predetermined threshold amount of time after being stored and is automatically deleted when the threshold amount of time has been reached. In some embodiments, received event data is categorized and stored in a specific data location/structure at least in part based on the categorization. For example, different data structures store different categories of event data.

At 206, the stored event data is processed using one or more event type filters to detect one or more types of events. In some embodiments, the event type filters include one or more preconfigured filters. For example, a user/administrator is able to add/remove/modify one or more desired filters to be applied by an AP. Each filter may define one or more criteria to identify a status and/or type of event of interest. For example, stored event data (e.g., network packets) is analyzed using an event type filter to determine whether a type of event to be detected using the filter has been detected. In one example, an event type filter analyzes stored event data of interest (e.g., searches for network packets containing specific content) to identify an event data pattern (e.g., repeated event data, a specific series of event data, etc.) that identifies a type of event. In some embodiments, a filter may perform actions such as send/receive data (e.g., requests for information) in order to detect a type of event. For example, once a certain event data (e.g., certain error message packet) has been detected by a filter, the filter sends an interrogation communication (e.g., test packet) to test a hypothesis of a cause of the certain event data and determines whether a certain type of event has occurred based on the response of the interrogation communication. In another example, once a type of event (e.g., network/communication error) has been detected using a filter, the filter initiates commands and/or communication to handle (e.g., mitigate and/or resolve) the type of event. In some embodiments, processing the event data includes periodically executing each event type filter to perform processing and event type detection of the event type filter. In some embodiments, the event type filter selects one or more event data entries of interest that meet a criteria of the event type filter to be included in a report to be sent for further analysis. For example, an event type filter is configured to send new control packets (e.g., packets specifying communication status, configuration, setup, error, etc.) in a report for further analysis.

At 208, any detected event type is reported. In some embodiments, once an event type filter has detected a type of event, a report of the detected type of event is sent. The report may be sent to an analysis server (e.g., server 118) and/or another AP for further analysis and/or archival/ reporting. For example, a centralized server with more computing resources than an AP may perform the analysis. In another example, an AP receives reports from other related APs and performs correlation across different reports to discover correlation results. In some embodiments, reporting the detected event type includes sending a copy of one or more stored event data (e.g., packets) corresponding to the detected type of event. For example, the event data stored in storage 110 of FIG. 1 that indicates the type of event is included in a report sent for further analysis. The report may include one or more of the following: information about the type of event identified, identification of one or more clients associated with the type of event, a status of one or more clients associated with the type of event, identification of an AP associated with the type of event, or a status of an AP and other information associated with the identified type of event. In some embodiments, by utilizing the reported information, the recipient may correlate the reported information across various other reports from other APs to determine a correlation result. For example, a network problem affecting one AP may be due to an error specific to the particular AP while the same network problem encountered by multiple different APs may be due to an error of a remote network service. In some embodiments, the report includes encrypted and/or compressed data. For example, a compressed version of event data is included in the report to reduce bandwidth required to transmit the report.

In some embodiments, reporting the detected event type includes tracking a status of the detected type of event once it has been detected. For example, once a network problem event type has been detected and reported, a status of the problem is tracked and reported until the problem has been resolved and/or is no longer applicable. In one example, a list of clients affected by the detected event type is maintained and the status of the event type for each client is periodically determined (e.g., send a query communication, analyze newly tapped event data, etc.) and any change in the status of the event type for each client is reported to an analysis server.

At 210, an instruction regarding one or more of the detected event types is received. In some embodiments, the instruction is received from a recipient that received the report sent in 208. For example, an analysis server provided the instruction. In another example, a remote AP provided the instruction. In some embodiments, the instruction is based at least in part on analysis and/or correlation results associated with the report sent in 208. For example, an instruction on how to handle the detected event type is received in 210. In some embodiments, the instruction modifies a status, a configuration, data, a filter, a software component, a driver, and/or other component or operation of an AP. In some embodiments, the instruction indicates a data to be sent from an AP. In some embodiments, the instruction includes a data (e.g., packet) to be processed (e.g., processed as a received packet) by the AP. In some embodiments, the instruction identifies that status updates regarding a specific detected event type should not be provided. For example, a recipient has received the report on the detected event type and does not desire additional information about the detected event type. In some embodiments, the instruction identifies one or more client instructions to be provided to the client for implementation by the client. In some embodiments, the instruction is associated with mitigation, preventing, and/or resolving an error detected as the detected event type. In some embodiments, step 210 is optional. For example, for a particular detected event type, an instruction is not received.

At 212 the instruction is implemented. In some embodiments, implementing the instruction includes executing processing identified by the instruction. In some embodiments, implementing the instruction includes implementing changes indicated by the instruction. For example, a configuration of an AP is modified as specified by the instruction. In some embodiments, implementing the instruction includes processing one or more packets included in the instruction as a packet received from a source different than the sender of the instruction. In some embodiments, implementing the instruction by an AP includes sending one or more packets instructed in the instruction as a packet originated by a client of the AP (e.g., spoofed packet).

Figure 3:
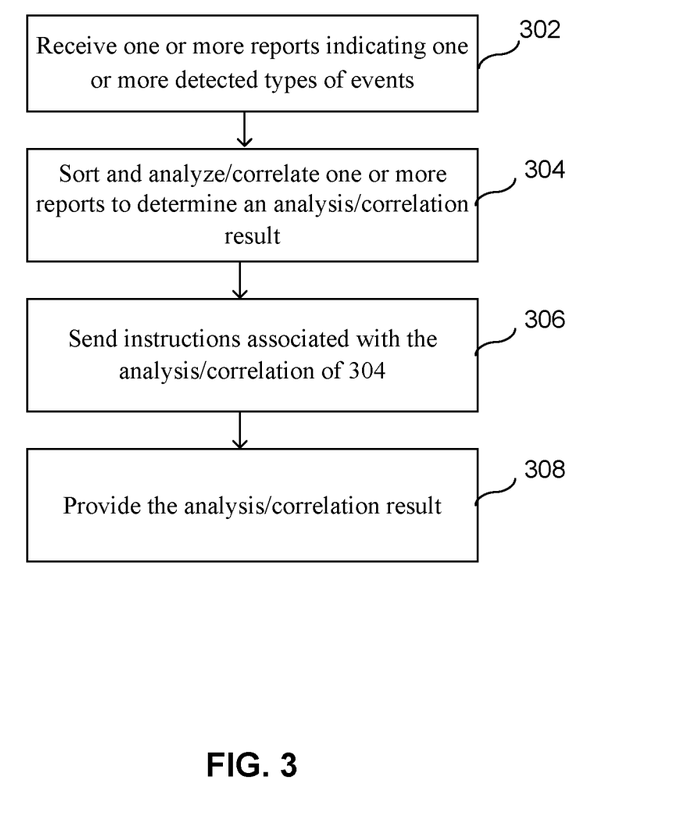
FIG. 3 is a flow chart illustrating an embodiment of a process for analyzing one or more reports of types of events.

FIG. 3 is a flow chart illustrating an embodiment of a process for analyzing one or more reports of types of events. The process of FIG. 3 may be implemented on analysis server 118 of FIG. 1.

At 302, one or more reports indicating one or more detected types of events are received. In some embodiments, one or more reports sent in 208 are received. In some embodiments, the report includes one or more event data (e.g., packets) to be analyzed. In some embodiments, the reports are received from a plurality of different APs and the reports from APs that are associated (e.g., APs of the same physical site) are grouped together. In some embodiments, reports for the same type of event are grouped together. The report may include one or more of the following: information about the type of event identified, identification of one or more clients associated with the type of event, status of one or more clients associated with the type of event, locations of one or more clients associated with the type of event, identification of an AP associated with the type of event, status of an AP, and other information associated with the identified type of event.

At 304, one or more reports are sorted and analyzed/ correlated to determine an analysis/correlation result. By processing analysis and/or correlation at a remote server, computationally expensive analysis tasks may be offloaded from an AP and trends across different APs may be correlated to better determine a cause and/or resolution of a type of event. In some embodiments, event data and/or other data included in reports may be extracted from the report and separately correlated/analyzed.

A separate software component may analyze and correlate reports for each different type of event. For example, a different analysis/correlation engine performs correlation for each different type of event and receives reports from the same event type filter of various different APs. In some embodiments, the analysis/correlation engines may be at least in part configured and/or specified by a user. For example, a user may program/specify a desired analysis/ correlation engine using an application programming interface (i.e., API) of an analysis server. In some embodiments, a single engine performs correlation and analysis for a plurality of different types of events. In some embodiments, one or more engines perform correlation and analysis using external event types (e.g., external events/data gathered/received from sources external to clients and APs) in addition to internal event types detected by one or more APs. For example, a release of a new operating system is received from an external source and correlated with event types reported by APs. In some embodiments, performing the correlation and analysis includes analyzing event data to identify an action to be performed based on analysis results. For example, event data is analyzed to identify a user indication, a warning, a message, a status, and/or other information to be provided. In another example, event data is analyzed to identify an action to be performed to mitigate, prevent, and/or resolve a problem (e.g., network error, AP component error, etc.) discovered using the analysis. In some embodiments, performing the correlation and analysis includes determining patterns, trends, and/or correlating detected types of events across different APs. For example, it is determined whether a same type of event associated with the same network component/service has been detected across a plurality of APs. In some embodiments, the number of clients and/or APs affected by a specific type of event may correspond to a different cause and/or resolution for the type of event. For example, an error event type detected at one AP may be due to the AP while an error event type detected across different APs may be due to a larger network failure. In some embodiments, the analysis/correlation result is stored in storage (e.g., stored in database 124 of FIG. 1).

At 306, instructions associated with the analysis/correlation of 304 are sent. In some embodiments, step 306 is optional. In some embodiments, the sent instruction is received at 210 of FIG. 2. In some embodiments, the instruction is based at least in part on analysis and/or correlation results performed in 304. For example, an instruction on how to handle a detected event type is provided. In some embodiments, the instruction is to modify a status, a configuration, data, a filter, a software component, a driver, and/or other component or operation of an AP. In some embodiments, the instruction indicates a data to be sent by an AP (e.g., sent by the AP originated by a client of the AP). In some embodiments, the instruction includes data (e.g., packet) to be processed (e.g., processed as a received packet) by an AP. In some embodiments, the instruction indicates a data to be sent to a client of an AP. In some embodiments, the instruction identifies that status updates regarding a specific detected event type are not to be provided. In some embodiments, the sent instruction is to be provided to a client to allow the client to implement the instruction to mitigate, prevent and/or resolve an error. In some embodiments, the instruction is associated with mitigating, preventing, and/or resolving an error (e.g., network error) detected as the detected event type.

At 308, the analysis/correlation result is provided. For example, a user and/or network administrator is provided an interface to view correlation/analysis results and/or a status/performance of one or more APs. In some embodiments, correlation/analysis results of an event type affecting clients of APs managed by a network administrator are able to be viewed by the network administrator via a webpage interface. In some embodiments, for a detected type of event (e.g., each network error), the identification of affected clients/APs, a number of the affected clients/APs, a status of the affected clients/APs, a length of time the affected clients/APs have been affected, possible resolutions for the detected type of event, instructions attempted to resolve the detected type of event, a performance of the affected clients/APs, and/or any other related data/information is provided. In some embodiments, providing the analysis/correlation result includes providing a notification message of the analysis/correlation.

Figure 4:
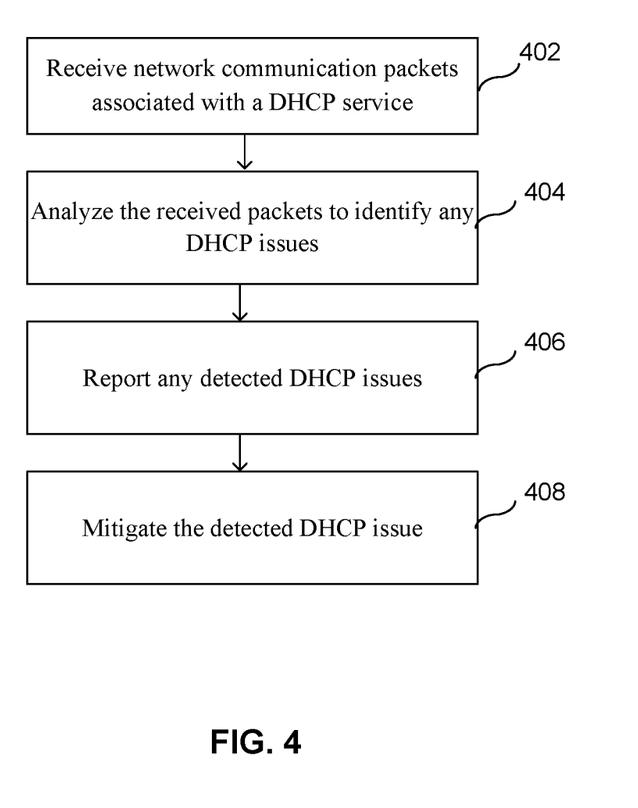
FIG. 4 is a flow chart illustrating an embodiment of a process for processing events to identify a Dynamic Host Configuration Protocol (i.e., DHCP) error.

FIG. 4 is a flow chart illustrating an embodiment of a process for processing events to identify a Dynamic Host Configuration Protocol (i.e., DHCP) error. The process of FIG. 4 may be implemented on wireless access point 102 of FIG. 1. In some embodiments, the process of FIG. 4 is a specific example of the process of FIG. 2. In some cases, a client of an AP is unable to obtain an IP address from a DHCP service (e.g., a DHCP server or a pool of DHCP servers). In the event a client is unable to obtain an IP address to access a network, it is desirable to resolve the error as soon as possible to enable the client to access the network as soon as possible. In some embodiments, the inability of a client to obtain an IP address is automatically detected by an event type filter that monitors for control packets that indicate the DHCP error event type. There may be various causes for the DHCP error, and in some embodiments, the cause is attempted to be discovered. If possible, the DHCP error may be automatically resolved.

At 402, network communication packets associated with a DHCP service are received. In some embodiments, receiving the packets includes tapping into wireless radio drivers of an AP to obtain control packets (e.g., DHCP discover, offer, request, acknowledgement, information, release, renewal, etc. packets) to and/or from a DHCP service/server. For example, when a new client requests an IP address lease by sending a DHCP discover control packet, DHCP offer control packets are received by a client via an AP from a DHCP service/server that makes an offer of an IP address lease, and the client responds via the AP to the offer by sending a DHCP request control packet that indicates the request for the offered IP address lease. This request may be acknowledged by the DHCP server using a DHCP acknowledgement packet. By obtaining these control packets that reveal the status DHCP service, the control packets may be stored and analyzed to detect any DHCP service problems. In some embodiments, receiving the packets includes intercepting the packets. The network communication packets may include control packets, data packets, message packets, or any other forms of communication packets. In some embodiments, receiving the packets includes specifically selecting network communication packets that are associated with a DHCP service. In some embodiments, the network communication packets associated with a DHCP service are included in a larger group of received network communication packets. In some embodiments, the network communication packets associated with the DHCP service are stored. For example, the packets are stored in storage 110 of FIG. 1.

At 404, the received packets are analyzed to identify any DHCP issues. In some embodiments, an event type filter (e.g., one filter of filters 112 of FIG. 1) that is configured to identify DHCP issues is executed. In some embodiments, analyzing the received packets includes analyzing a history of DHCP control packets that have been stored for analysis. In some embodiments, the DHCP issues to be detected include discovering a failure to obtain and/or renew an IP address lease. For example, specific packets identifying failures and/or a lack of an expected response packet are detected. In some embodiments, when a packet from a DHCP server indicates that an IP address pool has been exhausted, an IP address pool exhaustion failure is identified. In some embodiments, when a packet from a DHCP server indicates a service error, a DHCP service/server error is identified. In some embodiments, when a packet from a DHCP server indicates an error during a DHCP session to obtain an IP address lease, a DHCP session error is identified. In some embodiments, when a DHCP service is unresponsive, an unresponsive DHCP service is identified.

In some embodiments, a hypothesis of a type and/or cause of a DHCP issue is identified by analyzing the received DHCP control packets. In some embodiments, the hypothesis is tested by an event type filter to confirm or reject the hypothesis. In some embodiments, one or more packets (e.g., ping, ARP protocol packet, etc.) probing the state of the DHCP service/server and/or an IP address pool is sent and the response and/or a lack of a response is analyzed to confirm, reject, or modify the hypothesis. For example, because a DHCP service has not responded to a DHCP discover control packet, a preliminary hypothesis is made that the DHCP service is offline and this hypothesis is tested by pinging the DHCP service/server with a ping packet. In the event the DHCP service/server responds to the ping packet, the hypothesis is rejected and another hypothesis may be determined. In some embodiments, a request packet is sent to discover the type, model, provider, manufacturer, and/or version of the DHCP service/server. For example, a certain DHCP service/server version may be affected by a known bug, and a detected DHCP issue may be attributable to the bug if the DHCP service/server is of the certain version.

At 406, any detected DHCP issues are reported. The report may be sent to an analysis server (e.g., server 118) and/or another AP for further analysis and/or archival/reporting. For example, a centralized server with more computing resources than an AP may perform further analysis. In another example, an AP receives reports from other related APs and performs correlation across reports to discover any correlation in DHCP issues. The report may include one or more of the following: information about the type of DHCP issue, identification of one or more clients affected by the DHCP issue, copies of packets analyzed to determine the DHCP issue, communication sent to identify the DHCP issue (e.g., packets to confirm hypothesis), identification of an AP associated with the type of event, a status of an AP, and any other information associated with the identified DHCP issue. In some embodiments, by utilizing the reported information, the recipient may correlate the reported information across various other reports from other APs to determine a correlation result. For example, a DHCP problem affecting only one AP may be due to a network connection error specific to the particular AP while the same network problem encountered by multiple different APs simultaneously may be due to a DHCP service error. In some embodiments, the report includes encrypted and/or compressed data. For example, compressed versions of DHCP control packets are included in the report to reduce bandwidth required to transmit the report.

In some embodiments, once a DHCP issue has been detected and reported, the DHCP issue may be continually monitored, and a status update is provided when applicable until the issue has been resolved and/or is no longer applicable. For example, a list of clients affected by the DHCP issue is tracked and the status of the issue for each client is periodically determined (e.g., send a status query communication to the DHCP service and/or a client and analyze the response, analyze new DHCP control packets, etc.) and any changes in the status for each client are reported.

At 408, the detected DHCP issue is mitigated, if applicable. In some embodiments, the mitigation is based at least in part on analysis and/or correlation results associated with the report sent in 406. In some embodiments, the mitigation modifies a status, a configuration, data, a filter, a software component, a driver, and/or other component or operation of an AP. In some embodiments, the mitigation is associated with preventing and/or resolving the DHCP issue.

For example, instructions and/or control messages/packets are sent to a DHCP server and/or a client to resolve the detected DHCP problem. The actions to be performed to mitigate the DHCP problem may be determined by a recipient of the reports and provided to an AP to be implemented. In some embodiments, the actions to be performed are determined by an AP. For example, an event type filter of the AP specifies actions to be performed in the event a certain criteria/problem has been detected. In some embodiments, mitigating the DHCP problem includes performing an action on behalf of an affected client. For example, an AP generates and sends to a DHCP service/server a control packet to release an IP address lease that appears to the DHCP service/server (e.g., spoofed packet) as if the control packet was generated by the affected client. This may be necessary due to certain versions of a DHCP server that cannot handle DHCP renewals. For example, when a client attempts to renew an IP address lease prior to its expiration, some DHCP services/servers reject the renewal and force the client to obtain a new IP address lease. However, the previous IP address lease has not been released when the new IP address lease is requested and this may contribute to exhaustion of an IP address pool. When this is detected, an AP may send a control message to the DHCP server to release the previous IP address lease to free up the IP address of the previous IP address lease.

Figure 5:
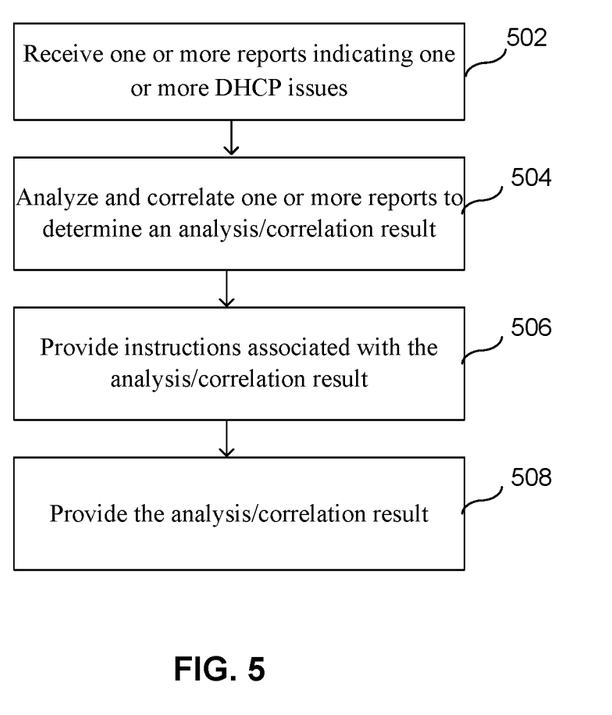
FIG. 5 is a flowchart illustrating an embodiment of a process for analyzing DHCP issue event type reports.

FIG. 5 is a flowchart illustrating an embodiment of a process for analyzing DHCP issue event type reports. The process of FIG. 5 may be implemented on analysis server 118 of FIG. 1. In some embodiments, the process of FIG. 5 is a specific example of the process of FIG. 3.

At 502, one or more reports indicating one or more DHCP issues are received. In some embodiments, one or more reports sent in 406 by one or more APs are received. In some embodiments, the reports are received from a plurality of different APs and the reports from APs that are associated (e.g., APs of same physical site, sent by the same event type filter, etc.) are grouped together.

At 504, one or more reports are analyzed and correlated to determine an analysis/correlation result. By processing analysis and/or correlation at a remote server, trends across APs may be correlated to determine a higher level issue and/or better determine a cause and/or resolution of the DHCP issue. In some embodiments, control packets and/or other data included in reports may be extracted from the report and separately correlated/analyzed. In some embodiments, performing the correlation and analysis includes analyzing the one or more reports to identify an action to be performed based on the analysis result. For example, the reports are analyzed to identify a user indication, a warning, a message, a status, and/or other information to be provided. In another example, the reports are analyzed to identify an action to be performed to mitigate, prevent, and/or resolve the DHCP issue. In some embodiments, performing the correlation and analysis includes determining DHCP issue trends and correlating DHCP issues across clients of different APs. For example, the number of clients and/or APs affected by a specific DHCP problem may indicate the cause and/or resolution for the DHCP issue event type (e.g., only one affected AP is likely an internal issue with the AP while multiple affected APs are likely a problem with a DHCP service). In some embodiments, the analysis/correlation result is stored in storage (e.g., stored in database 124 of FIG. 1).

At 506, instructions associated with the analysis/correlation result are provided. For example, the instruction is sent via a network to an AP that has encountered the DHCP issue. In some embodiments, step 506 is optional. In some embodiments, the sent instruction is received at 408 of FIG. 4 to mitigate the detected DHCP issue. In some embodiments, the instruction is based at least in part on analysis and/or correlation results performed in 504. For example, an instruction on how to resolve the DHCP issue is provided. In some embodiments, the instruction specifies a modification of a status, a configuration, data, a filter, a software component, a driver, and/or other component or operation of an AP or a client of the AP. In some embodiments, the instruction identified an action to be performed by an AP on behalf of a client. For example, an AP generates and sends to a DHCP service/server a control packet to release an IP address lease that appears to the DHCP service/server (e.g., spoofed packet) as if the control packet was generated by the affected client. In some embodiments, the instruction is an instruction received by an AP in 408 of FIG. 4 to mitigate the DHCP issue.

At 508, the analysis/correlation result is provided. For example, a user and/or network administrator is provided an interface to view a summary of DHCP issues encountered by clients/APs managed by the user. For example, the DHCP status summary is provided via a webpage interface. In some embodiments, for each type of detected DHCP issue, an identification of the DHCP issue, an identification of affected clients/APs, a number of the affected clients/APs, a status of the affected clients/APs, a length of time the affected clients/APs have been affected, possible resolutions for the detected DHCP issue, actions attempted to resolve the detected DHCP issue, a performance of the affected clients/APs, and/or any other related data/information is provided to allow an administrator to track and manage the DHCP issue.

Figure 6:
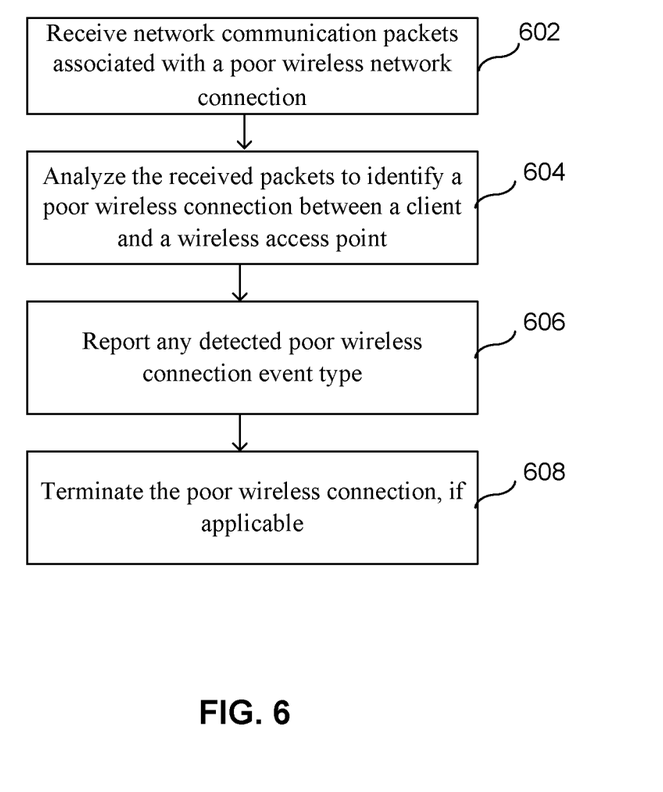
FIG. 6 is a flowchart illustrating an embodiment of a process for processing events to identify a client roaming error.

FIG. 6 is a flowchart illustrating an embodiment of a process for processing events to identify a client roaming error. The process of FIG. 6 may be implemented on wireless access point 102 of FIG. 1. In various embodiments, the process of FIG. 6 is a specific example of the process of FIG. 2. In some cases, a client of an AP is unable to properly roam between different APs to obtain the best wireless network connection. For example, a large physical site such as a hotel building includes many deployed APs to cover various different physical location zones of the hotel building. An ideal client efficiently roams and connects to an AP that provides the best service. For example, once a wireless signal strength is below a threshold value for at least a threshold amount of time and another valid AP with a stronger signal strength has been detected, the client should connect to the new AP. However, certain clients, such as Apple Corporation iOS devices, attempt to maintain connection with a currently connected AP for as long as possible despite poor network performance and despite having available a different AP with stronger signal strength. This may optimize performance for a typical home environment with a single AP but may perform poorly in environments with multiple APs. In some embodiments, situations when a client should roam to a different AP are automatically detected by using an event type filter that monitors for network packets to detect poor network performance for the client.

At 602, network communication packets associated with a poor wireless network connection are received. In some embodiments, receiving the packets includes tapping into wireless radio drivers of an AP to obtain event data (e.g., packets identifying retries, wireless signal strength, repeated packets, etc.). For example, when a wireless connection between a client and an AP is poor, transmitted packets may become lost. This may lead to packets that are repeated (e.g., response was not received so packet is retried) and requested again. In some embodiments, a received packet may indicate (e.g., in metadata) a signal strength detected by a client. In some embodiments, the received packet may indicate a signal strength of a client connection detected by an AP. The network communication packet may include a control packet and a data packet. In some embodiments, the received packet may indicate APs and associated signal strength able to be detected by a client. In some embodiments, receiving the packets includes intercepting the packets. The network communication packets may include control packets, data packets, message packets, or any other forms of communication packets. In some embodiments, receiving the packets includes specifically selecting network communication packets that are associated with a wireless connection performance. In some embodiments, the received network communication packets are stored. For example, the packets are stored in storage 110 of FIG. 1.

At 604, the received packets are analyzed to identify a poor wireless connection between a client and a wireless access point. For example, the wireless connection may be poor due to low wireless signal strength. In some embodiments, an event type filter (e.g., one filter of filters 112 of FIG. 1) that is configured to identify poor wireless connections is executed. In some embodiments, analyzing the received packets includes identifying whether a communication error rate and/or a detected/reported wireless signal strength threshold is below corresponding threshold values. In the event the detected communication error rate and/or a detected/reported wireless signal strength is below corresponding threshold values, a poor wireless connection event type is detected and identified. In some embodiments, information about a client is probed and obtained. For example, a device type of the client, a model/version of the wireless component of the client, an operating system of the client, and/or other information about the client is obtained to enable determination of a solution. In some embodiments, one or more packets probing the client are sent and the corresponding response(s) are analyzed.

At 606, any detected poor wireless connection event type is reported. The report may be sent to an analysis server (e.g., server 118) and/or another AP for further analysis and/or archival/reporting. For example, a centralized server with more computing resources than an AP may perform further analysis. In another example, an AP receives reports from other related APs and performs correlation across reports to discover a better AP for a client. The report may include one or more of the following: detected wireless devices of an AP and corresponding associated wireless signal strengths, clients of an AP and corresponding associated wireless signal strengths, communication error rates of clients of an AP, identification of one or more clients associated with weak wireless connections, copies of packets analyzed to determine the poor wireless connection, communication sent to identify the poor wireless connection, information about an AP, a status of an AP, a physical location coordinate of a client, information about affected clients, and any other information associated with the identified weak connection(s). In some embodiments, by utilizing the reported information, the recipient may correlate the reported information across various other reports from other APs to determine a correlation result. For example, a client that should roam to another AP is identified (e.g., client that is an iOS device and able to establish a better connection with another AP is identified). In some embodiments, the report includes encrypted and/or compressed data. For example, compressed versions of packets are included in the report to reduce bandwidth required to transmit the report.

In some embodiments, once a poor wireless connection has been detected, the connection status may be continually monitored, and a status update is provided when applicable until the connection status is no longer weak and/or has been disconnected. For example, a list of clients with poor wireless connections is tracked and the wireless connection status for each client is periodically determined and any changes in the status for each client is reported to an analysis server.

At 608, the poor wireless connection is terminated, if applicable. For example, an AP terminates a connection with a client to force the client to connect to another AP. The client may attempt to reestablish a wireless connection with the same AP associated with the weak wireless connection and the AP may continually refuse and/or terminate the repeated connection attempts for the client associated with the weak wireless connection for at least a configured amount of time and/or a configured number of attempts. The AP may allow the reconnection attempt in the event a signal strength of the client has improved by at least a threshold amount. The decision to terminate the connection to force a client to connect to another AP may be determined by a server that received the reports sent in 606. In some embodiments, the decision to terminate the connection is determined by an AP. For example, an event type filter of the AP specifies that a weak wireless signal is to be terminated in the event the client is able to connect to another valid AP associated with a stronger wireless signal.

Figure 7:
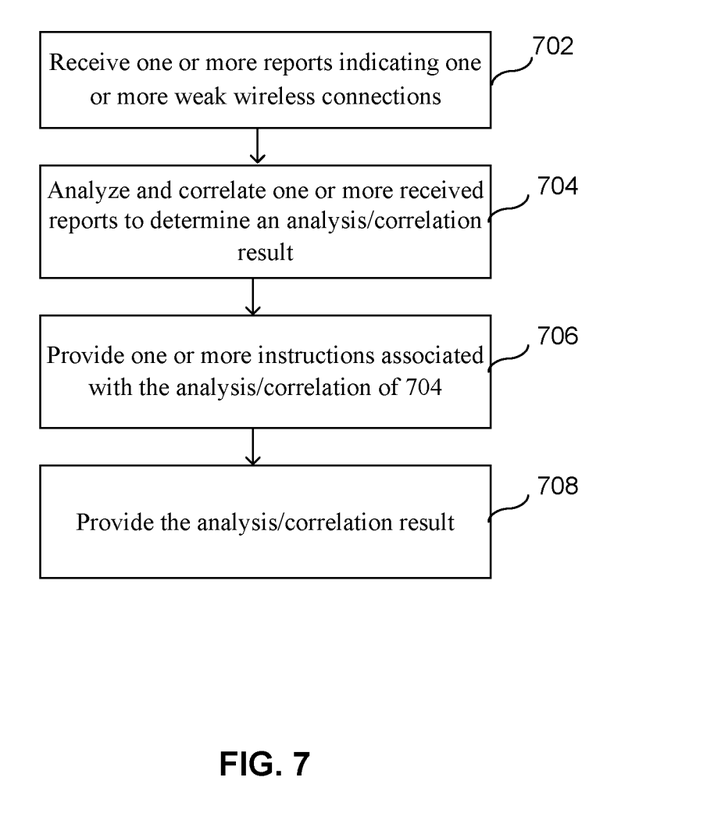
FIG. 7 is a flow chart illustrating an embodiment of a process for analyzing reports of a poor wireless connection.

FIG. 7 is a flow chart illustrating an embodiment of a process for analyzing reports of a poor wireless connection. The process of FIG. 7 may be implemented on analysis server 118 of FIG. 1. In some embodiments, the process of FIG. 7 is a specific example of the process of FIG. 3.

At 702, one or more reports indicating one or more weak wireless connections are received. In some embodiments, one or more reports sent in 606 by one or more APs are received. In some embodiments, the reports are received from a plurality of different APs and the reports from related APs (e.g., APs of the same physical site) are grouped together.

At 704, one or more received reports are analyzed and correlated to determine an analysis/correlation result. By processing analysis and/or correlation at a remote server, wireless connections across different APs may be tracked and managed at a central location to determine the best AP for each client. In some embodiments, packets and/or other data included in the reports may be extracted from the report and separately correlated/analyzed. In some embodiments, performing the correlation and analysis includes analyzing the one or more reports to identify an action to be performed based on the analysis result. For example, the reports are analyzed to identify whether a client with a weak wireless signal strength connection to an AP should be disconnected to force the client to connect to another AP.

In some embodiments, the type of client affected by the poor wireless connection is identified and in the event it is known that the client is of a type (e.g., iOS device type) known to not roam efficiently, it is determined whether a better AP for the client is available (e.g., would be better served by another AP identified at least in part by analyzing signal strength between the client and various APs as reported by the client and/or the various APs). For example, if the signal strength between the client and another AP is stronger by at least a threshold amount, it is determined that a better AP is available for the client. In some embodiments, a status, a performance, a number of clients, and other information about APs are included in the reports and are utilized to determine whether a better AP for the client is available. For example, although a client affected by a poor wireless connection can connect to another AP associated with a higher signal strength, this AP is not a better AP for the client because the AP is currently overloaded. In some embodiments, the better AP is identified by determining/identifying a physical location of a client and identifying the best AP to provide wireless network access at the location of the client. In some embodiments, the better AP is identified by analyzing signal strength of a client detected by a plurality of APs. For example, each AP provides a report of wireless devices detected and associated signal strengths and the AP that reported the strongest signal strength for the client is selected. In some embodiments, analyzing and correlating the reports includes determining a best distribution of wireless clients across APs of a site that maximizes one or more network performance factors (e.g., average bandwidth, peak bandwidth, reliability, etc.). In some embodiments, the analysis/correlation result is stored in storage (e.g., stored in database 124 of FIG. 1).

At 706, one or more instructions associated with the analysis/correlation of 704 are provided. For example, the instruction is sent via a network to an AP that is to disconnect a client. In some embodiments, step 706 is optional. In some embodiments, the sent instruction is received at 608 of FIG. 6 to disconnect a client associated with a poor wireless signal. In some embodiments, the instruction is based at least in part on analysis and/or correlation results performed in 704. For example, a client associated with a weak wireless signal is to be disconnected if a better AP is available for the client and fits with a determined distribution plan. In another example, a client associated with a weak wireless signal is to be disconnected if the client is of a specific type (e.g., iOS) and a better AP is available for the client.

At 708, the analysis/correlation result is provided. For example, a user and/or network administrator is provided an interface to view a summary of wireless network performance. For example, performance metrics for wireless connections are provided via a webpage interface. In some embodiments, for weak wireless connections, the identification of affected clients/APs, a number of the affected clients/APs, a status of the affected clients/APs, a length of time the affected clients/APs have been affected, possible resolutions for the detected type of event, instructions attempted to resolve the detected type of event, a performance of the affected clients/APs, and/or any other related data/information is provided.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method, comprising:
monitoring, based on one more instructions included in an event filter, packets in communication between a client of a first wireless access point and a network service;
determining, by the first wireless access point and based on the one or more instructions included in the event filter, a root cause of an issue relating to the packets monitored in the communication between the client and the network service, wherein determining the root cause of the issue is based on at least a correlation of an event detected by the first wireless access point and an event detected by a second wireless access point; and
transmitting, by the first wireless access point, an indication of the root cause of the issue relating to the packets monitored in the communication between the client and the network service.

2. The method of claim 1, further comprising:
transmitting, based on the one or more instructions in the event filter, a message to the network service to confirm the determined root cause; and
confirming the root cause based on whether a response from the network service is received by the first wireless access point.

3. The method of claim 2, wherein the message transmitted to the network service is a ping packet, and the root cause is confirmed if no response to the ping packet is received by the first wireless access point.

4. The method of claim 2, further comprising:
generating the message as a request for information including one or more of a type, model, provider, manufacturer, or version of the service; and
receiving a response from the service indicating the requested information, wherein the confirmation of the root cause is based on the requested information.

5. The method of claim 1, further comprising:
receiving a report from the second wireless access point that specifies the event detected by the second wireless access point,
correlating the event detected by the first wireless access point and the event detected by the second wireless access point specified in the report received from the second wireless access point to determine the root cause.

6. The method of claim 1, wherein the event detected by the second wireless access point is detected based on packets exchanged between a client of the second wireless access point and the network service.

7. The method of claim 1, further comprising:
identifying, based on the determined root cause, an action to mitigate the issue; and
transmitting, a message specifying the action to mitigate the issue to the network service.

8. The method of claim 7, wherein the network service is a dynamic host control protocol (DHCP) service, and the method further comprises generating the message as a DHCP control packet that requests a release of an IP address lease.

9. A system, comprising:
hardware processing circuitry;
one or more memories storing instructions that when executed configure the hardware processing circuitry to perform operations comprising:
monitoring, based on one more instructions included in an event filter, packets in communication between a client of a first wireless access point and a network service;
determining, by the first wireless access point and based on the one or more instructions included in the event filter, a root cause of an issue relating to the packets monitored in the communication between the client and the network service, wherein determining the root cause of the issue is based on at least a correlation of an event detected by the first wireless access point and an event detected by a second wireless access point; and
transmitting, by the first wireless access point, an indication of the root cause of the issue relating to the packets monitored in the communication between the client and the network service.

10. The system of claim 9, the operations further comprising:
transmitting, based on the one or more instructions included in the event filter, a message to the network service to confirm the determined root cause; and
confirming the root cause based on whether a response from the network service is received by the first wireless access point.

11. The system of claim 10, wherein the message transmitted to the network service is a ping packet, and the root cause is confirmed if no response to the ping packet is received by the first wireless access point.

12. The system of claim 10, further comprising:
generating the message as a request for information including one or more of a type, model, provider, manufacturer, or version of the service; and
receiving a response from the service indicating the requested information, wherein the confirmation of the root cause is based on the requested information.

13. The system of claim 9, further comprising:
receiving a report from the second wireless access point that specifies the event detected by the second wireless access point; and
correlating the event detected by the first wireless access point and the event detected by the second wireless access point specified in the report received from the second wireless access point to determine the root cause.

14. The system of claim 9, wherein the event detected by the second wireless access point is detected based on packets exchanged between a client of the second wireless access point and the network service.

15. The system of claim 9, further comprising:
identifying, based on the determined root cause, an action to mitigate the issue; and
transmitting a message specifying the action to mitigate the issue to the network service.

16. The system of claim 15, wherein the network service is a dynamic host control protocol (DHCP) service, and the operations further comprise generating the message as a DHCP control packet that requests a release of an IP address lease.

17. The system of claim 16, further comprising determining, by the first wireless access point, and based on the one or more instructions included in the event filter and the packets, that the root cause is IP address pool exhaustion.

18. The system of claim 16, further comprising determining, by the first wireless access point, and based on instructions included in the event filter and the packets, that the root cause is a service error.

19. The system of claim 16, wherein the generating of the message is generated by the first wireless access point instead of the client of the first access point.

20. A non-transitory computer readable storage medium comprising instructions that when executed configure hardware processing circuitry of a first wireless access point to perform operations comprising:
- monitoring, based on one more instructions included in an event filter, packets in communication between a client of the first wireless access point and a network service;
- determining, based on the one or more instructions included in the event filter, a root cause of an issue relating to the packets monitored in the communication between the client and the network service, wherein determining the root cause of the issue is based on at least a correlation of an event detected by the first wireless access point and an event detected by a second wireless access point; and
- transmitting an indication of the root cause of the issue relating to the packets monitored in the communication between the client and the network service.

* * * * *